United States Patent Office 2,973,253

Patented Feb. 28, 1961

2,973,253

ETCHING OF SEMICONDUCTOR MATERIALS

Richard R. Stead, Richardson, Tex., assignor to Texas Instruments Incorporated, Dallas, Tex., a corporation of Delaware

No Drawing. Filed Dec. 9, 1957, Ser. No. 701,308

9 Claims. (Cl. 41—42)

This invention relates to the etching of surfaces of semiconductor materials, such as germanium and silicon, in the course of preparing them for use in electrical semiconductor devices, such as diodes and transistors, and to an etching solution particularly adapted for this use.

Almost all semiconductor diodes, transistors and other such devices utilize very small blocks or bars of monocrystalline semiconductor material to which are affixed two or more electrical connections. To achieve a workable device, the bars or blocks must be treated in some fashion before the leads are attached to remove any foreign materials or contaminants from their surfaces and also to remove any crystal lattice defects on their surfaces. Such crystal lattice defects are caused by the cutting and sawing operations necessary to cut large single crystals of semiconductor material into bars and blocks of the proper size for use in semiconductor devices. This preliminary treatment step generally employs an acid etching treatment which is commonly referred to as "initial etching." For this initial etching it is possible to use an etching solution, generally referred to as CJ–4, comprising hydrofluoric acid, nitric acid, acetic acid and a small amount of bromine. Other possible etching solutions which may be employed for this initial etching are disclosed in my co-pending applications Serial No. 600,162 and Serial No. 600,164, both filled on July 26, 1956, and both entitled Etching of Semiconductor Materials, now U.S. Patents 2,871,110 and 2,927,011 respectively.

Furthermore, after the initial etching has been completed, and after one or more base leads have been attached to the treated bars, such as by alloying or by electrical bonding, it is desirable to "clean" each connection by removing material not completely alloyed or bonded from around the connection, since this material may bridge the connection and cause shorting. This cleaning step generally consists of a second etching treatment which is commonly referred to as "final etching." In the past the etching solutions employed for this final etching have been substantially the same as, or similar to, the CP–4 solution recited above relative to initial etching.

Again, it has been found that certain units which go through the normal etching procedure, consisting of the initial etching and the final etching, exhibit unsatisfactory electrical characteristics which will be described hereinafter in greater detail. These unsatisfactory units are, therefore, subjected to a further etching treatment which is commonly referred to as "re-etching." The etching solutions employed for the re-etching treatment are generally modified forms of the solutions employed in the prior treatment steps.

The present invention relates to an improved etching solution which is designed for use in the initial etching and in the final etching treatments and to a modified form of this solution for use in the re-etching treatment. First of all, the etching solution of the present invention which is designed for both initial and final etching includes a mixture of hydrofluoric and nitric acids to which has been added a small amount of di-sodium phosphate. The final etching is accomplished by an etching operation commonly referred to as "stream etching." This designation of "stream etching" has been given to the etching operation by virtue of the fact that the semiconductor bar is held in a continuous stream of the etching composition. Secondly, the etching solution used for re-etching consists of the same ingredients mentioned above, but includes, in addition, a certain amount of acetic acid which has been added as a buffering agent. It has been found that the addition of acetic acid to the solution slows down the rate of etching thereby effecting a control. In experiments using these improved etching solutions, it has been found that consistently better results are achieved than with those solutions previously employed, and that etching is subject to better control without pitting of the surface of the semiconductor material. Further, germanium units of various types and silicon n–p–n units etched in the solutions of this invention showed consistently improved $I_{co}$, Z and $\beta$ characteristics over similar units etched in the previously employed solutions. As is well known to those skilled in the art, these symbols designate, in general, the characteristics of reverse polarity current, collector voltage breakdown and small signal current amplification factor, respectively, of a transistor. Additionally, the use of these improved etching solutions provides a chemically polished surface upon which it is easy for the observer to locate the junction between the materials of two different types of conductivity and, thus, the point at which a lead or leads must be attached.

Accordingly, an object of this invention is to provide an improved process for the preparation of the surfaces of semiconductor materials used in electrical semiconductor devices by etching the surfaces in a solution comprised of hydrofluoric acid, nitric acid and di-sodium phosphate.

A further object of this invention is to provide improved etching solutions which comprise hydrofluoric acid, nitric acid and di-sodium phosphate.

An additional object of this invention is to provide improved etching solutions which comprise hydrofluoric acid, nitric acid, acetic acid and di-sodium phosphate.

Other and further objects and advantageous features of this invention will hereinafter more fully appear in connection with the detailed description which follows.

According to this invention, it has been discovered that electrical semiconductors, such as silicon and germanium, can be chemically polished under controlled conditions to produce improved characteristics and finish by the use of an etching solution which consists of about 30 parts by volume of 70% nitric acid, about 20 parts by volume of 48% hydrofluoric acid and about 1 part by volume of a 2% di-sodium phosphate solution. The etching solution used for the re-etching step consists of about 30 parts by volume of 70% nitric acid, 20 parts by volume of 48% hydrofluoric acid, 1 part by volume of 2% solution of di-sodium phosphate, and 25 parts by volume of glacial acetic acid. In the case of this second phosphate etch, the acetic acid has been added as a buffering agent.

*Example I*

An etching solution suitable for use as an initial etch or as a final etch was prepared by mixing 180 ml. of 48% hydrofluoric acid, 9 ml. of 2% $Na_2HPO_4$ solution, and 270 ml. of 70% nitric acid. These quantities represent 20, 1 and 30 parts by volume of the hydrofluoric acid, the phosphate solution and the nitric acid, respectively. Although the above proportions of ingredients represent the preferred volumetric relationship, nevertheless, the present invention admits of a certain flexibility in the proportions selected, for example, the nitric acid may vary between 10 and 80 parts by volume; the hydrofluoric acid may vary from 10 to 50 parts by volume and one part by volume of the 2% phosphate solution which is held constant as the other constituents are varied.

*Example II*

A second etching solution primarily designed for the purpose of re-etching can be prepared by intermixing 120 ml. of 48% of hydrofluoric acid, 6 ml. of 2% di-sodium phosphate solution, 180 ml. of 70% nitric acid, and 150 ml. of glacial acetic acid. This latter solution has been found to be particularly well suited for the re-etching of diodes which have not responded as well with other solutions heretofore employed for the same purpose. Although the stated proportions given above represent the preferred proportions of this re-etching solution, nevertheless, within the scope of this invention, the hydrofluoric acid may vary from 10 to 50 parts by volume, the nitric acid may vary from 10 to 80 parts by volume, the acetic acid may vary from about 5 to about 150 parts by volume, and one part by volume of the 2% phosphate solution which is held constant as the other constituents are varied.

It is obvious that a lesser amount of more concentrated hydrofluoric acid may replace the amounts of 48% hydrofluoric acid specified without losing the effectiveness of the etching solution. However, in such cases it will be found desirable to add a sufficient amount of distilled water to bring the total concentration in line with those that will result from the mixing of the reagents specified in the concentrations and proportions as set forth above.

Other and further modifications, apart from those shown or suggested herein, may be made within the spirit and scope of this invention.

What is claimed is:

1. A method of etching a surface of an electrical semiconductor which comprises etching said surface in a solution of nitric acid, hydrofluoric acid, and di-sodium phosphate.

2. A method as claimed in claim 1 in which the etching solution has added thereto acetic acid.

3. A method as claimed in claim 1 in which the electrical semiconductor is germanium.

4. A method as claimed in claim 1 in which the electrical semiconductor is silicon.

5. An etching solution for etching the surface of an electrical semiconductor which comprises a solution of nitric acid, hydrofluoric acid, and di-sodium phosphate in the proportion of about 10 to about 80 parts by volume of concentrated nitric acid, about 10 to 50 parts by volume of 48% hydrofluoric acid, and one part by volume of a 2% di-sodium phopshate solution.

6. An etching solution as claimed in claim 5 in which acetic acid is added thereto.

7. An etching solution as claimed in claim 6 in which said acetic acid is added in the proportion of about 5 to 150 parts by volume.

8. An etching solution for etching the surface of electrical semiconductors which comprises a solution of 30 parts by volume of concentrated nitric acid, 20 parts by volume of 48% hydrofluoric acid, and 1 part by volume of 2% di-sodium phosphate solution.

9. An etching solution for etching the surface of electrical semiconductors which comprises a solution of 30 parts by volume of concentrated nitric acid, 20 parts by volume of 48% hydrofluoric acid, 25 parts by volume of glacial acetic acid and 1 part by volume of a 2% solution of di-sodium phosphate solution.

References Cited in the file of this patent

UNITED STATES PATENTS

| | | |
|---|---|---|
| 2,514,879 | Lark-Horovitz | July 11, 1950 |
| 2,619,414 | Heidenreich | Nov. 25, 1952 |
| 2,698,780 | Logan | Jan. 4, 1955 |
| 2,827,367 | Cox | Mar. 18, 1958 |
| 2,847,287 | Landgren | Aug. 12, 1958 |
| 2,871,110 | Stead | Jan. 27, 1959 |
| 2,893,929 | Schnable | July 7, 1959 |